(12) United States Patent
Birnie et al.

(10) Patent No.: US 7,184,765 B1
(45) Date of Patent: Feb. 27, 2007

(54) ENHANCED ROAMING NOTIFICATION OF CALL HANDOFFS

(75) Inventors: William Kevin Birnie, Yardley, PA (US); S. Anthony Dennis, Somerset, NJ (US); Mark Daniel Furnari, Lebanon, NJ (US); Gang Li, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/384,646

(22) Filed: Aug. 27, 1999

(51) Int. Cl.
*H04Q 7/20* (2006.01)

(52) U.S. Cl. ............... 455/432.3; 455/437; 455/567
(58) Field of Classification Search ............. 455/406, 455/407, 432, 436, 437, 440, 443, 567, 434, 455/458, 435, 524, 525, 432.1, 432.3, 435.1, 455/435.2, 435.3; 370/331
See application file for complete search history.

(56) References Cited

U.S. PATENT DOCUMENTS

| | | | | |
|---|---|---|---|---|
| 4,945,570 A | * | 7/1990 | Gerson et al. ............... 455/563 |
| 5,255,307 A | * | 10/1993 | Mizikovsky ................. 455/432 |
| 5,402,481 A | * | 3/1995 | Waldman .................... 455/432 |
| 5,442,806 A | * | 8/1995 | Barber et al. ................ 455/432 |
| 5,450,613 A | * | 9/1995 | Takahara et al. ............ 455/67.7 |
| 5,613,204 A | * | 3/1997 | Haberman et al. ........... 455/432 |
| 5,722,068 A | * | 2/1998 | Bartle et al. ................. 455/436 |
| 5,732,347 A | | 3/1998 | Bartle et al. ................. 455/421 |
| 5,797,098 A | * | 8/1998 | Schroeder et al. .......... 455/464 |
| 5,802,468 A | * | 9/1998 | Gallant et al. ............... 455/432 |
| 6,018,652 A | * | 1/2000 | Frager et al. ................ 455/406 |
| 6,018,655 A | * | 1/2000 | Bartle et al. ................. 455/436 |
| 6,073,010 A | * | 6/2000 | Dufour ........................ 455/432 |
| 6,148,197 A | * | 11/2000 | Bridges et al. .............. 455/432 |
| 6,198,939 B1 | * | 3/2001 | Holmström et al. ......... 455/566 |
| 6,201,957 B1 | * | 3/2001 | Son et al. ..................... 455/406 |
| 6,208,872 B1 | * | 3/2001 | Schmidt ...................... 455/432 |
| 6,212,408 B1 | * | 4/2001 | Son et al. ..................... 455/563 |
| 6,230,017 B1 | * | 5/2001 | Andersson et al. .......... 455/440 |
| 6,243,572 B1 | * | 6/2001 | Chow et al. ................. 455/432 |

FOREIGN PATENT DOCUMENTS

WO 96/34500 10/1996

OTHER PUBLICATIONS

Patent No. 5,109,401, filed on Jul. 6, 1990 and issued on Apr. 28, 1992 to Hattori et al.
Patent No. 5,577,100, filed on Jan. 30, 1995 and issued on Nov. 19, 1996 to McGregor et al.
Patent Abstract of Japan, Publication No. 08191482, Jul. 23, 1996 of Application No. 07002918, filed Jan. 11, 1995, Takenori et al. Translation: yes.
Patent No. DE 297 01 579, issued in Germany on Jan. 31, 1997 to T. Köhler. Translation: yes.

* cited by examiner

*Primary Examiner*—William Trost
*Assistant Examiner*—Rafael Perez-Gutierrez

(57) ABSTRACT

A mobile wireless terminal is configured to provide an audible alert to the user in the event of its receipt, while the terminal is on a call, of an indication of an imminent or directed handoff to a carrier or network which would charge the user for roaming. The call is automatically terminated or released within a predetermined time period after the audible alert unless the user performs an act of assent, such as pressing a predetermined key, or speaking a predetermined command, before the expiration of the time period.

18 Claims, 3 Drawing Sheets

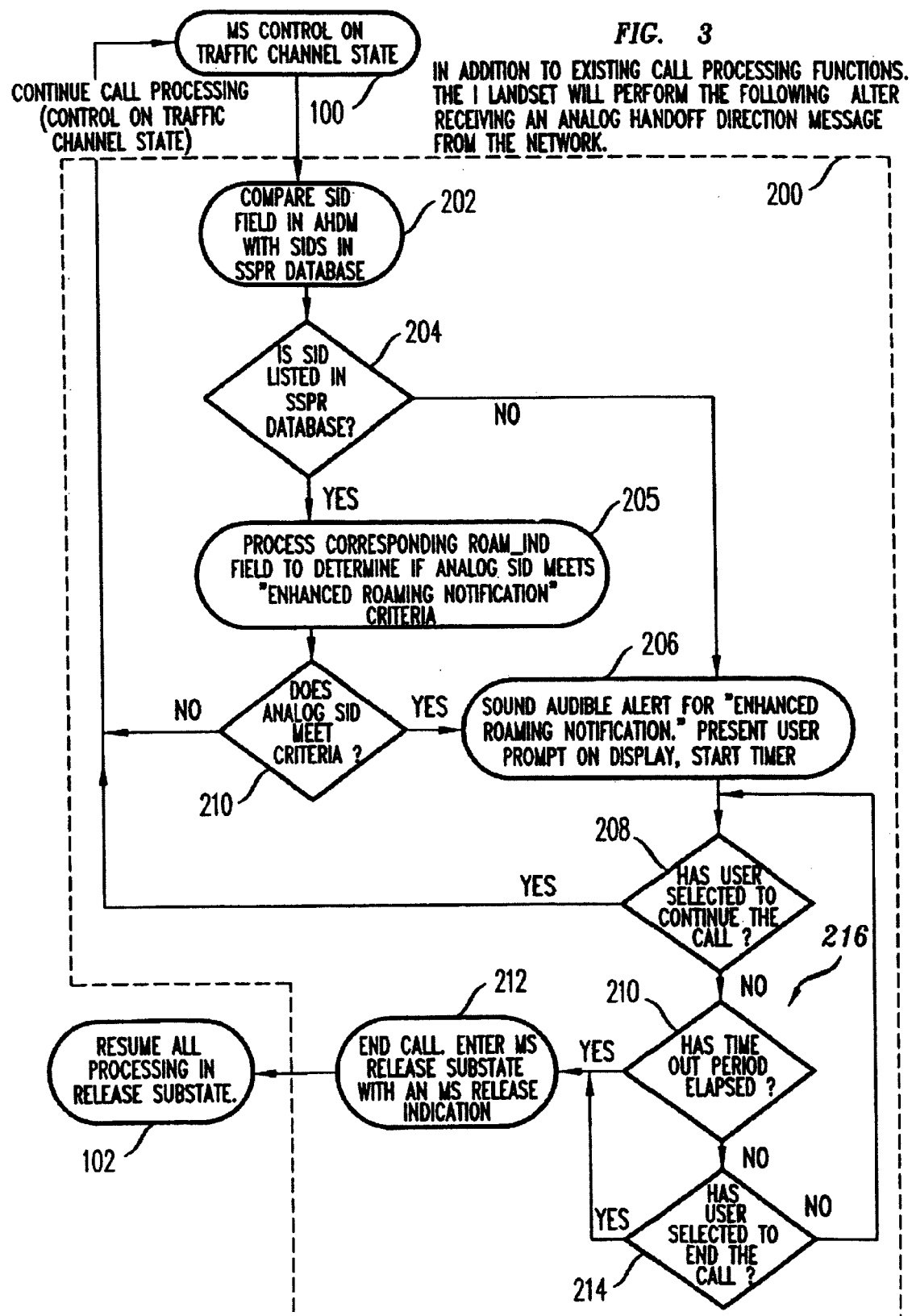

ENHANCED ROAMING NOTIFICATION OF CALL HANDOFFS

BACKGROUND OF THE INVENTION

1. Field of the Invention

The present invention relates to a wireless terminal; more particularly, to a wireless terminal for use with wireless communications systems of different carriers, network types, or modes.

2. Description of the Prior Art

It is common for prior art wireless terminals to provide a visual indication, generally of the present roaming status when the terminal is in a standby state. However, such an indication is not generally provided when the terminal is on a call, and even if it were, such a visual indication would not be seen or noticed by the user when the terminal is in active use. Consequently, the user is not generally aware of a change from a non-roaming status to a roaming status which occurs when the terminal is moved through or in the neighborhood of a coverage area boundary while on a call, and is certainly not aware at all of an impending change to roaming status, before the actual change occurs.

The change to a roaming status while on a call can be particularly expensive when there is a so-called hard handoff between a digital PCS (Personal Communications Services operating at 1900 MHZ) network of the user's primary carrier to an analog cellular or AMPS (Analog Mobile Phone System operating at 800 MHZ) network of a secondary carrier that would charge the user as a roamer. In this situation, the user may incur a per minute charge that the user considers excessive, and may also incur an additional per call or per day charge. Such hard handoffs from digital PCS to analog networks while on a call are rather common, because the buildout of PCS networks in the United States is incomplete and primarily existing in densely populated areas. This leads to customer dissatisfaction with the primary PCS carrier as a result of unexpected charges due to roaming.

SUMMARY OF THE INVENTION

The present invention provides a mobile wireless terminal which provides an audible alert to the user in the event of its receipt, while the terminal is on a call, of an indication of an imminent or directed handoff to a carrier which would charge the user for roaming. The terminal may be configurable to refrain from following a handoff direction or to automatically terminate or release the call within a short predetermined time period after the audible alert unless the user performs an act of assent, such as pressing a predetermined key, or speaking a predetermined command, before the expiration of the time period.

In one embodiment a wireless terminal is capable of operating on a network of a primary carrier and one or more networks of secondary carriers, and is switchable from the network of a primary network to a network of a secondary carrier during an existing call in response to a handoff message when the handoff message includes information identifying the carrier or network receiving the handoff, the terminal determines whether the network receiving the handoff would result in incurring additional charges such as roaming. If additional charges will be incurred, the terminal initiates one or more actions, including the sounding of an audible alert. The terminal's user may actively indicate in response to the audible alert whether the user wishes to continue the call notwithstanding that charges would be incurred. The user may provide a response to the audible alert by pressing a predetermined key, or speaking a predetermined command or utterance.

In another embodiment of the invention, the terminal provides a timer that automatically terminates the call after the expiration of a predetermined time period if the call is still active and the user has not indicated that the call is to be continued.

In yet another embodiment of the invention, the user may actively terminate the call in response to the audible alert without waiting for the automatic termination that would occur upon expiration of the predetermined time period.

BRIEF DESCRIPTION OF THE DRAWINGS

FIG. 3 is a flowchart indicating a process carried out by the digital processing section in accordance with the principles of the present invention.

DETAILED DESCRIPTION

Figure 1:
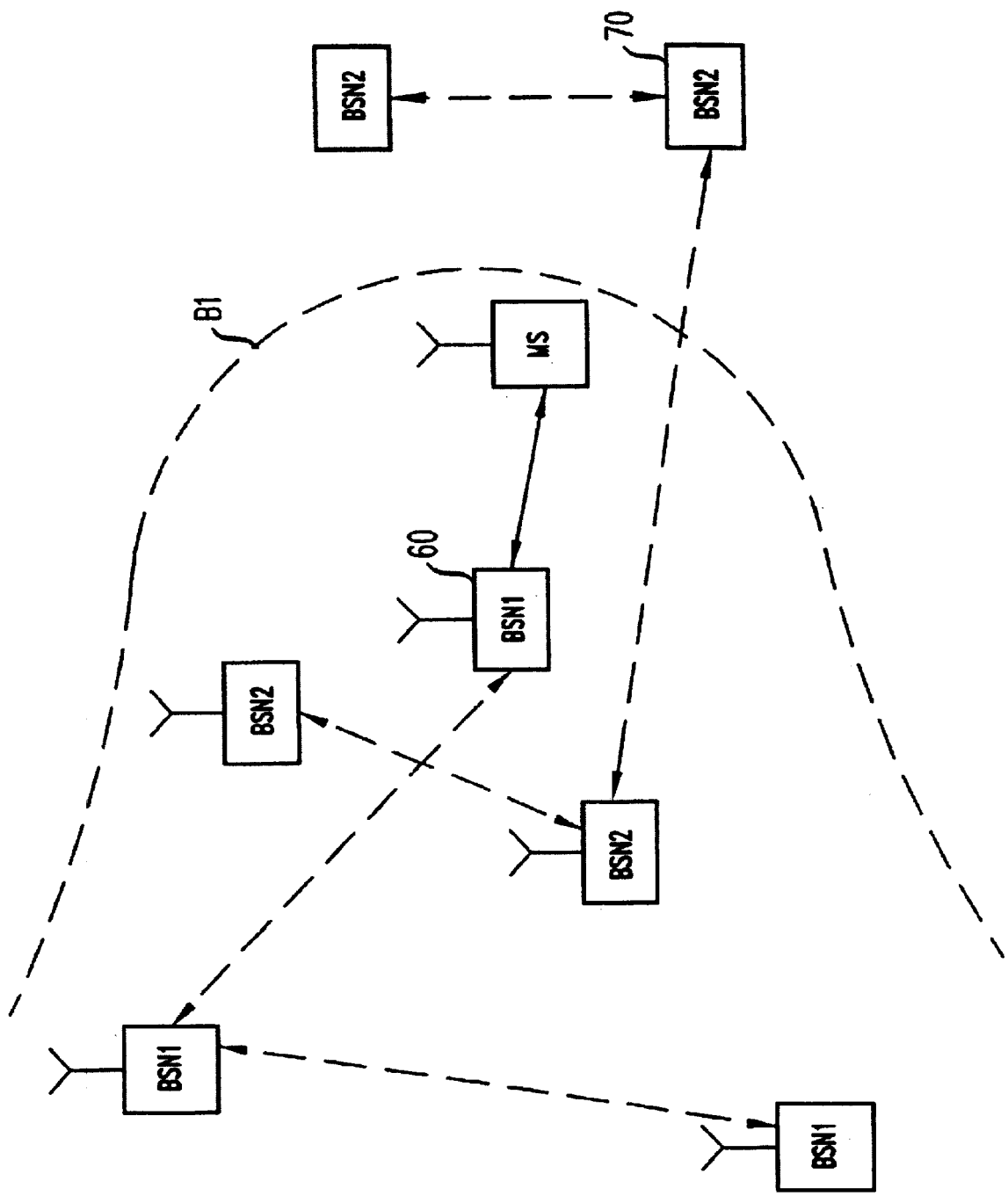
FIG. 1 schematically shows an illustrative plan view of an arrangement of base stations of two different networks, in conjunction with a mobile terminal.

FIG. 1 illustrates a mobile terminal or station MS, a cellular arrangement of spaced apart base stations BS1 of a first wireless network operated by or for the primary carrier to which mobile station MS is assigned. FIG. 1 also shows a cellular arrangement of spaced apart second base stations BS2 of a secondary carrier via which mobile station MS may be on a call, but may incur per minute, and/or per call or per day charges as a roamer. When mobile station is on a call and travels within the confines of the coverage area of one network having base stations BS1, so-called soft handoffs are made between base stations to maintain the mobile station communication with the base station having the best signal strength or signal-to-noise ratio as measured by the mobile station MS. This typically results in the mobile station being in communication with the closest base station BS1, such as base station 60. When mobile station is on a call via the nearest 60 of the base station BS1 of the primary carrier and passes through a boundary B1 of the coverage area of the arrangement of base stations BS1, a handoff to a nearest 70 of the base stations BS2 of the secondary carrier is necessary in order to maintain the call.

Where the handoff is between networks of different types, such as from a digital PCS system operating at 1900 MHZ (digital PCS system may be any digital multiple access type including but not limited to CDMA (Code Division Multiple Access), TDMA (Time Division Multiple Access), and GSM (Global System for Mobile communications)) to an AMPS (Analog Mobile Phone System) system operating at 800 MHZ, the handoff is referred to as a "hard handoff". Hard handoffs use an Analog Handoff Direction Message (AHDM) to initiate a handoff. The AHDM is sent from base station BS1 60 with which mobile M is presently communicating to an identified nearest base station BS2 70 of the secondary analog carrier. The AHDM is also sent to the mobile station. It is this type of handoff that may be particularly troublesome to the user, because there is the possibility, based on inter-carrier agreement, or lack thereof, that the user would be charged for the ongoing call as roaming. Such a roaming charge will typically include a per minute charge, and may also include a per call or per day charge. Absent steps taken to notify the user, preferably prior to the implementation of the directed handoff, the user would be unaware that additional charges were being incurred in the ongoing call.

While the invention is equally applicable to digital PCS terminals of the aforementioned different types, for purpose of illustration terminology applicable to CDMA is used in further description herein.

Figure 2:
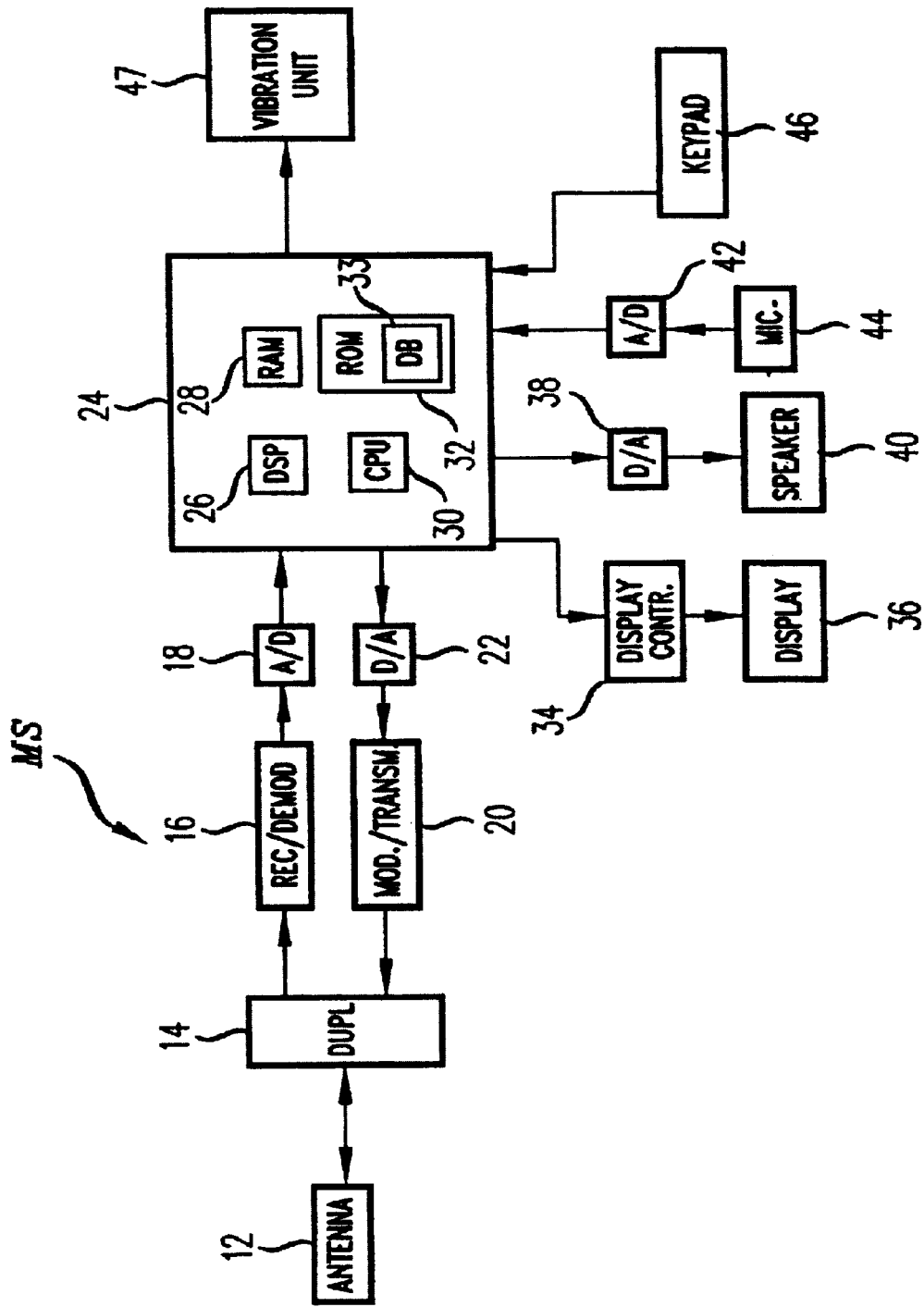
FIG. 2 is a schematic of a handset including a programmed digital processing section.

FIG. 2 shows a typical digital mobile terminal or station MS and includes an antenna 12 coupled for two way RF communication with a duplexer 14, which in turn feeds a reception signal path composed of receiver/demodulator 16 and analog to digital converter 18, and is fed by a transmission signal path composed of modulator/transmitter 20 and digital to analog converter 22. The converters A/D 18 and D/A 22 are connected to a digital processing section 24 which includes digital signal processor (DSP) 26, volatile Random Access Memory (RAM) 28, Central Processing Unit (CPU) 30, and non-volatile Read-Only Memory (ROM) 32. Both RAM 28 and ROM 32, or assigned parts thereof, are accessible to the DSP 26 and CPU 30, respectively. ROM 32 contains the firmware programs and data used by DSP 26 and CPU 30 and is entirely or at least in part electrically programmable to include various information programmed at the time the mobile station MS is distributed to the user, including identities of the mobile station and of the primary carrier.

Among the items so programmed in ROM 32 is a database 33 (SSPR database) identifying systems of carriers with which the primary carrier has a roaming agreement, indexed by System Identifiers (SIDs), which includes a field ROAM_IND indicating whether the user will incur charges as roaming when using that system.

Mobile station MS also includes coupled to digital processing module 24, a display controller 34 which drives a display 36, which is for example a Liquid Crystal Device (LDC) panel, a digital to analog converter 38 which controls a speaker 40, an analog to digital converter 42 which is fed from a microphone 44, a keypad 46, and a piezoelectric vibration unit 47. The speaker 40, in addition to its usual functions may be driven to provide an audible alarm providing a roaming notification to the user in accordance with the principles of the present invention. Keyboard 46, in addition to its usual functions, may serve as input means for the user, by pressing a first determined key thereof to indicate that the user has elected to continue the call notwithstanding the notification, and to press a second predetermined key thereof to indicate that the user has selected to end the call. Alternatively, spoken commands by the user into microphone 44 may be recognized by digital processing section 24 to indicate the user's selection among these alternatives.

FIG. 3 shows a flowchart implemented by firmware based program instructions to CPU 30 pertaining to an additional call processing instruction module 200 provided in accordance with the principles of the present invention in addition to the usual mobile station controls on traffic channel state 100, which occur when the mobile station is on a call, and call processing in release substate 102, which occur when a call has ended.

As shown in FIG. 3, when an Analog Handoff Direction Message (AHDM) is received by MS control on the traffic channel control state 100, step 202 of instruction module 200 is reached wherein the SID field in the AHDM is compared with SIDs in the SSPR database. At step 204 it is determined whether this SID is listed in the SSPR database. If not, it is assumed that the user will be charged excessively for roaming and step 206 is reached, wherein the following four actions are initiated: (It should be noted that actions b and/or c and/or d may be omitted from alternative embodiments, and that action d may be used in place of or in addition to action a.)

a) the audible alert, such as a buzz or beep, is sounded via speaker 40;

b) the display 36 presents a prompt to the user of which keys to press to signify a selection to continue or to end the call;

c) a timer formed by CPU 30 is started to time a predetermined period, for example ten seconds;

d) activating a vibrating alert.

If, on the other hand, the SID in the AHDM is listed in the SSPR database, then step 205 is reached, wherein the corresponding ROAM_IND field is checked to see if the analog SID meets a predetermined roaming notification criteria, which may be presettable by the user. Such criteria may be defined by whether a maximum per minute charge the user has programmed as acceptable is exceeded, and/or whether an additional per call or per day charge would be incurred exceeding user programmed maximum amounts. If it is determined in step 207 that the criteria for notification of the user are met, then step 206 is reached, which step has already been described. If, on the other hand, it is determined in step 207 that the criteria for notification are not met, then step 100 is returned to in order to continue the control on Traffic Channel State.

After step 206, step 208 is reached where it is tested whether the user has actively selected to continue the call, by pressing a predetermined key of keypad 46 or speaking a predetermined command into microphone 44. If the user has selected to continue the call then step 100 is returned to, thereby continuing the control on Traffic Channel State. if on the other hand the user has not actively selected to continue the call then step 210 is reached wherein it is tested whether the predetermined or user programmed period timed by the timer has expired or elapsed.

If in step 210 it is determined that the predetermined time period has elapsed, then step 212 is reached wherein the call is ended and the MS Release Substate is entered with an MS release indication, after which step 102 is reached in which call processing is resumed in the Release Substate. If, on the other hand, it is determined in step 210 that the predetermined time period has not yet elapsed, then step 214 is reached wherein it is tested whether the user has actively selected to end the call by pressing a different predetermined key of keypad 46 or speaking a different predetermined command into microphone 44.

If in step 214 it is determined that the user has selected to end the call, then step 212 is reached ending the call, etc. If, on the other hand, it is determined in step 214 that the user has not selected to end the call, then step 208 is again reached. It is noted that steps 208, 210, and 214 form a condition monitoring loop 216 which is exited by first satisfying any of the tested conditions. If the first to occur is the user selecting to continue the call, step 100 is reached, whereas if the first to occur is either the predetermined time period of the timer elapsing, or the user selecting to end the call, then step 212, and ultimately step 102 are reached.

It should now be appreciated that the objects of the invention have been satisfied by the foregoing description of the invention. While the present invention has been described in particular detail, it should also be appreciated that numerous modifications are possible within the intended spirit and scope of the invention.

The invention claimed is:

1. A wireless terminal that alerts a user of a handoff of a call from a first communication service station to a second communication service station, comprising:
   a receiver that receives a handoff indicating message;
   a memory containing a collection of acceptable identifiers; and
   a processor that determines if a received identifier of the second communication service station is at least one of the collection of acceptable identifiers and activates a vibrating alert during the call if the received identifier is not at least one of the collection of acceptable identifiers.

2. The wireless terminal of claim 1, wherein the processor automatically terminates the call after activating the vibrating alert if a call continuation indication is not received.

3. A wireless terminal that alerts a user of a handoff of a call from a first communication service station to a second communication service station, comprising:
   a receiver that receives a handoff indicating a message;
   a memory containing a collection of acceptable identifiers; and
   a processor that determines if a received identifier of the second communication service station is at least one of the collection of acceptable identifiers and activates an audible alert during the call if the received identifier is not at least one of the collection of acceptable identifiers.

4. The wireless terminal of claim 3, wherein the processor automatically terminates the call after activating the audible alert if a call continuation indication is not received.

5. A method for alerting a wireless terminal user of a handoff of a call from a first communication service station to a second communication service station, comprising the steps of:
   receiving a handoff indicating message;
   determining, at a wireless terminal, whether a received identifier of the second communication service station is at least one of a collection of acceptable identifiers; and
   producing a vibrating alert during the call if the received identifier is not at least one of the collection of acceptable identifiers.

6. The method of claim 5, wherein the call is automatically terminated after producing the vibrating alert if a call continuation indication is not received.

7. The method of claim 6, wherein the call is automatically terminated after a user programmed time if a call continuation indication is not received.

8. The method of claim 6, wherein the call is automatically terminated after a predetermined time if a call continuation indication is not received.

9. The method of claim 6, wherein the call continuation indication is an activation of a key.

10. The method of claim 9, further comprising the step of displaying information identifying at least one key as a call continuation indication key.

11. The method of claim 6, wherein the call continuation indication is an utterance.

12. A method for alerting a wireless terminal user of a handoff of a call from a first communication service station to a second communication service station, comprising the steps of:
    receiving a handoff indicating message;
    determining, at a wireless terminal, whether a received identifier of the second communication service station is at least one of a collection of acceptable identifiers; and
    producing an audible alert during the call if the received identifier is not at least one of the collection of acceptable identifiers.

13. The method of claim 12, wherein the call is automatically terminated after producing the audible alert if a call continuation indication is not received.

14. The method of claim 13, wherein the call is automatically terminated after a user programmed time if a call continuation indication is not received.

15. The method of claim 13, wherein the call is automatically terminated after a predetermined time if a call continuation indication is not received.

16. The method of claim 13, wherein the call continuation indication is an activation of a key.

17. The method of claim 16, further comprising the step of displaying information identifying at least one key as a call continuation key.

18. The method of claim 13, wherein the call continuation indication is an utterance.

* * * * *